United States Patent [19]

Baddore et al.

[11] 3,791,470
[45] Feb. 12, 1974

[54] MOTORIZED WHEELBARROW

[75] Inventors: William A. Baddorf; Paul E. Baddorf, both of Dillsburg, Pa.

[73] Assignee: Baddorf & Sons, Inc., Dillsburg, Pa.

[22] Filed: Oct. 26, 1971

[21] Appl. No.: 192,541

[52] U.S. Cl. .................................. 180/19 R, 298/3
[51] Int. Cl. ............................................. B62d 51/04
[58] Field of Search ... 180/19 R, 19 H, 19 S; 298/2, 298/3

[56] References Cited
UNITED STATES PATENTS

| | | | |
|---|---|---|---|
| 2,253,288 | 8/1941 | De Lucchi | 180/19 R |
| 2,670,052 | 2/1954 | Craver | 180/19 R X |
| 2,760,589 | 8/1956 | Rudman | 180/19 R |
| 3,007,536 | 11/1961 | Overstreet | 180/19 R |

Primary Examiner—David Schonberg
Assistant Examiner—John A. Pekar

[57] ABSTRACT

A motorized wheelbarrow having engine and associated drive parts mounted adjacent the wheel axle under the body overhang; the gas tank is mounted on the opposite side of the wheel from the motor and at a special angle to provide fuel output from an end of the tank at all normal operating angles; the wheel is dog driven and all parts of the drive mechanism and motor are adapted for easy access and quick installation on common wheelbarrows using only a brace and bit plus the holes ordinarily found; an embodiment is disclosed in which the wheel is laterally shifted and provided with a cylindrical tread for counter-balancing purposes.

8 Claims, 8 Drawing Figures

PATENTED FEB 12 1974

WILLIAM A. BADDORF
PAUL E. BADDORF
INVENTORS

BY John F. McClellan Sr
ATTORNEY

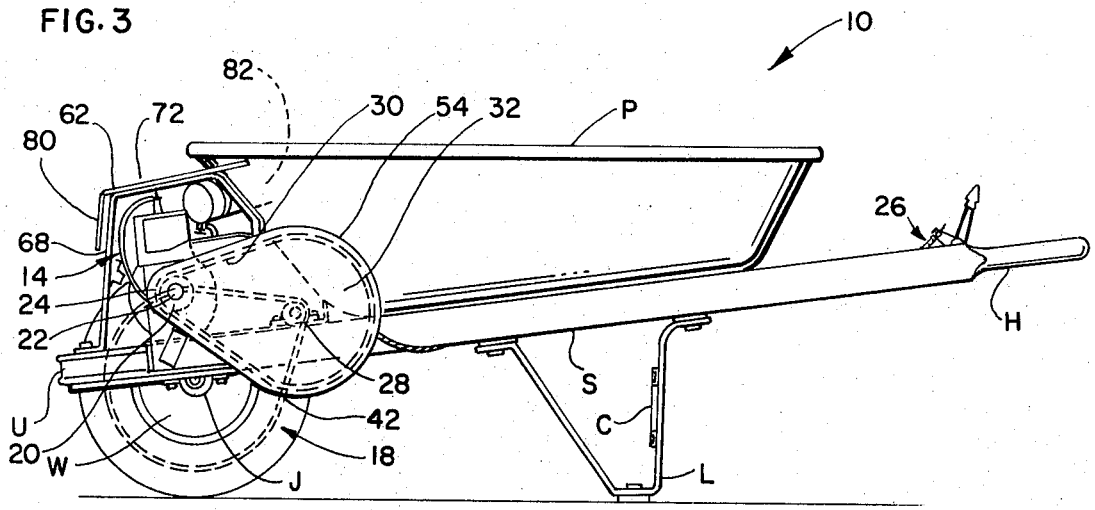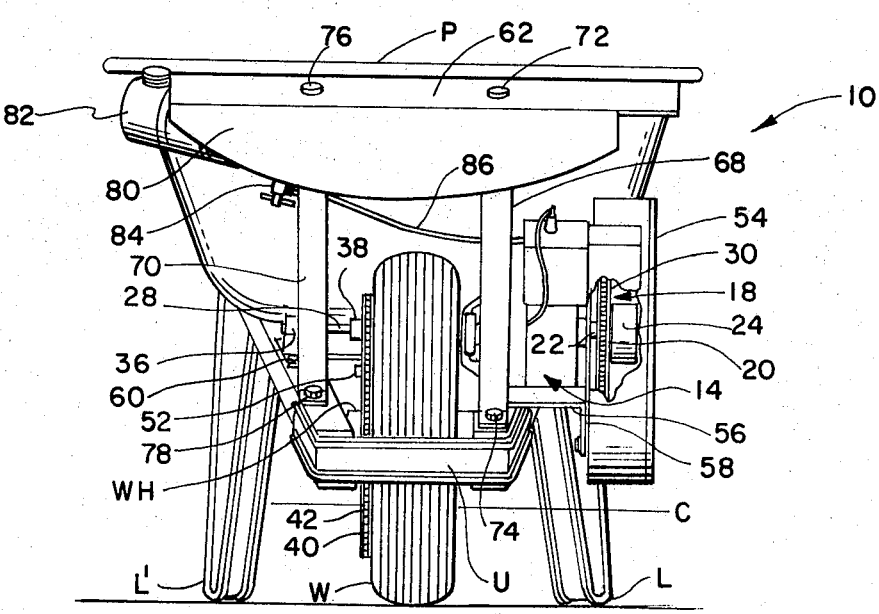

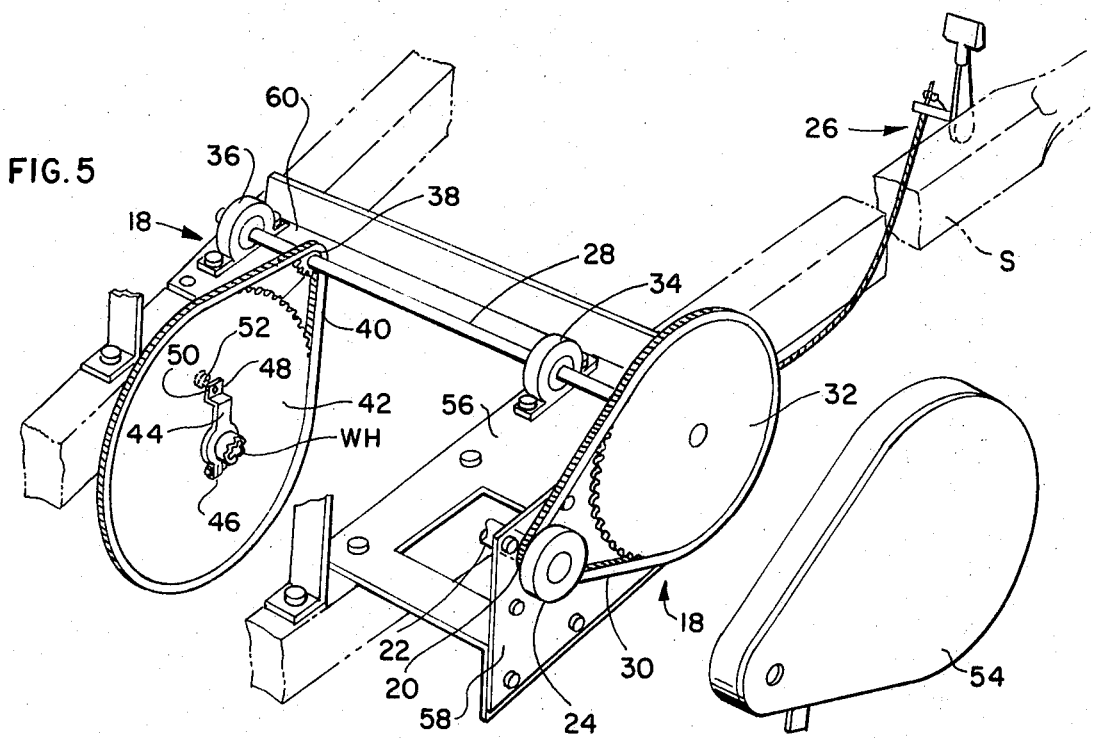
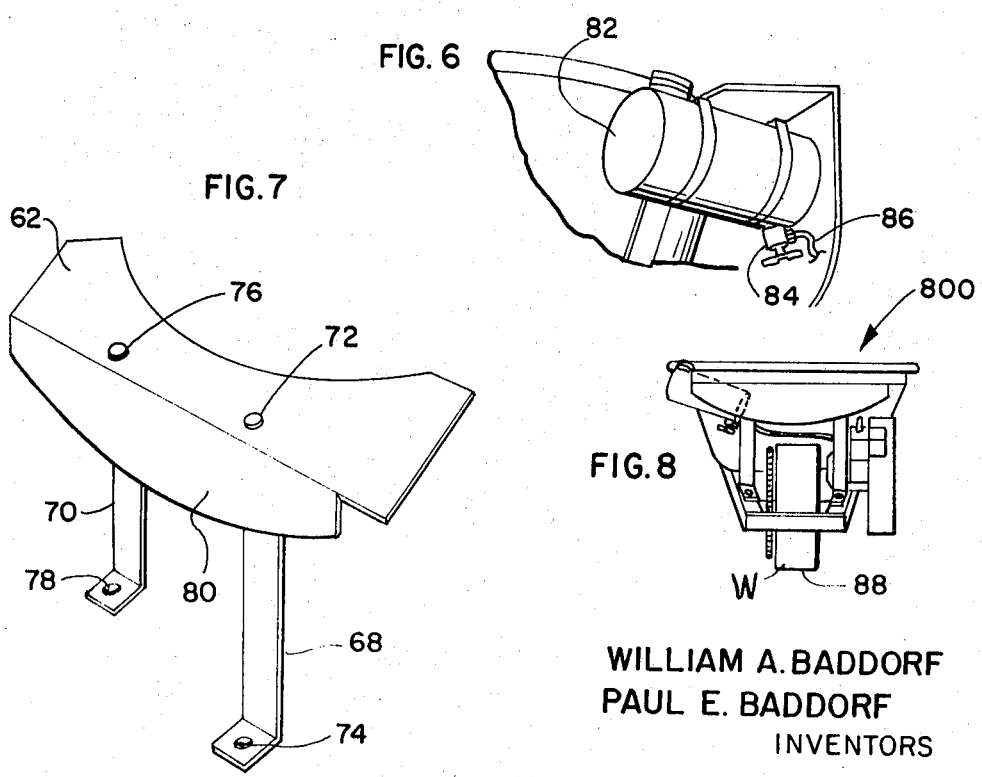
WILLIAM A. BADDORF
PAUL E. BADDORF
INVENTORS
BY *John F. McClellan Sr.*
ATTORNEY

MOTORIZED WHEELBARROW

This invention relates generally to common wheelbarrows and specifically to single-wheel wheelbarrows having propulsive devices. The common single-wheel wheelbarrow is one of the most useful and widely used construction tools. Common wheelbarrows combine load-carrying capacity and dumping facility with maneuverability to a degree not equalled by other devices.

Because the center of gravity is above the roll center, the length is short, and there is only a single wheel, the common wheelbarrow can be steered easily by tipping even with a heavy load, in contrast with multi-wheel carts. The common wheelbarrow can be navigated over narrow trestles barely wide enough for a man, and can be dumped in three directions, as opposed to cart dumping. Wheelbarrows can be braked by grounding the rear, with little tendency for the front to swing around, in contrast with carts and other plural-wheeled vehicles, and for this reason wheelbarrows can be used to carry loads more safely up and down steep inclines. A sturdy cross-bar provided in construction wheelbarrows between the rear legs can be lowered when necessary as a stabilizing brake onto walkways which are too narrow for the wheelbarrow legs to engage. Visibility ahead is adequate with full loads of heavy material such as concrete or brick.

The one considerable drawback to wheelbarrows is the effort needed to propel them when heavily loaded, the effort being a combination of lifting, pushing and balancing. In the prior art, motors have been provided to ease this burden, but at considerable cost in one or more important factors.

Specialized wheelbarrows have been disclosed with engines placed low and ahead of the wheel. These hamper or prevent dumping over the wheel, and add to the overall length, reducing maneuverability and visibility.

Wheelbarrows have been disclosed with engines slung under the pan behind the wheel. Several drawbacks result from this arrangement. First, the operator's burden is increased. When the wheelbarrow is empty this increase is a dead load for the operator. With the wheelbarrow loaded, the net load must be reduced by a substantial amount. When the wheelbarrow is dumped over the wheel, the weight of the motor and drive apparatus remains a cantilevered burden which must be humped up to a position in which it becomes dangerously top-heavy when the load slides out of the pan, progressively reducing the "ballast" as the wheelbarrow approaches the vertical.

A second drawback of the under-the-pan motor location which is equally as serious as the dead-weight increase in the operator's burden, is the reduction in steering maneuverability.

Because the load in a proper wheelbarrow is carried not only above the axle but also above a plane connecting the axle with the operator's hands, placing it well above the roll center, a loaded wheelbarrow is easy to steer by tipping. This almost-power-steering effect achieved through provision of a high center of gravity, is perhaps the most necessary and important single advantage of wheelbarrows. Yet the underslung engine positions disclosed in the prior art directly detracted from this feature, since the weight of the drive apparatus opposed the tipping.

Additionally, because of the low position, the prior art engines and associated equipment were exposed to damage from stakes, blocks, and other low fixed objects passed, to damage when the wheel slipped off walkways, and to splashing when used in muddy locations.

Principal objects of the present invention therefore are to provide a motorized wheelbarrow in which:

steering visibility, maneuverability and dumping are substantially unhampered by addition of associated equipment;

balance is such that the operator is substantially relieved of the weight of the engine and associated equipment, without sacrifice of either transport or dumping maneuverability;

the engine and associated equipment are in a raised location, protected from splashing, from damaging contact with low, fixed objects such as stakes and blocks, and from damage when the wheel runs off the ends of walkways and the like;

the construction of the engine and associated equipment is simple and rugged, and the installation is substantially or entirely and quickly done in ordinary wooden-shaft construction wheelbarrows using only a brace-and-bit and a wrench;

free-wheeling when the motor is not needed requires only the removal of a single, easily accessible screw;

accessibility is everywhere excellent, cost is minimal, operation is safe, and appearance is attractive.

In typical embodiment the invention comprises a single-wheel common barrow having a tractive engine and associated equipment mounted at the sides of the wheel and under the overhang of the pan, with the center of gravity of the added mass being above the roll axis and practically balanced about the axis of the wheel through unique disposition of the parts.

The above and other advantages and objects of the invention will become more readily apparent on examination of the following description, including the drawings in which:

FIGS. 3 and 4 are side and front elevations respectively of the invention in normal attitude for loading;

FIG. 5 is a perspective detail of the invention, partially broken away and spaced for exposition;

FIG. 6 is a fragmentary detail in perspective of shield and tank;

FIG. 7 is a perspective detail of shield construction; and

FIG. 8 is a front elevation diagram of an embodiment of the invention showing the wheel laterally shifted and showing use of a cylindrical-tread tire.

In the following detailed discussion of the drawings, like numbers indicate like parts in the Figures.

FIG. 1 shows the invention 10, a motorized wheelbarrow of unique design, in use by an operator M, transporting material.

The wheelbarrow is of the classic design comprising a single wheel W supporting a load pan P on twin straight shafts S, S', diverging from the wheel axle and terminating in handles H, H', at the divergent ends. Legs L, L' (not shown) connected by a crossbar C provide means to stand the wheelbarrow. The shafts are united in front by a U-shaped reinforcement U, and the wheel axle is mounted in journals J, J' (not shown) beneath the shafts. The wheel hub is designated by WH (shown in later Figures).

In contrast with prior motorized wheelbarrow designs, the engine unit 14 and drive assembly 18 of the invention are mounted near the axis "A," of the wheel. Part of the mass of the engine unit and drive assembly is compactly positioned ahead of the axle and part is compactly positioned behind it. Similarly, part of the mass is located on either side of the wheel. Most of the added mass is above the straight shafts of the wheelbarrow and is thus above the roll center.

The net result of the arrangement is that even though the wheelbarrow is somewhat heavier than if unpowered, the added mass is so nearly statically balanced under both load supporting and near-vertical dumping conditions that the operator is relieved of tractive effort, but no substantial amount of dead load is added.

Figure 1:
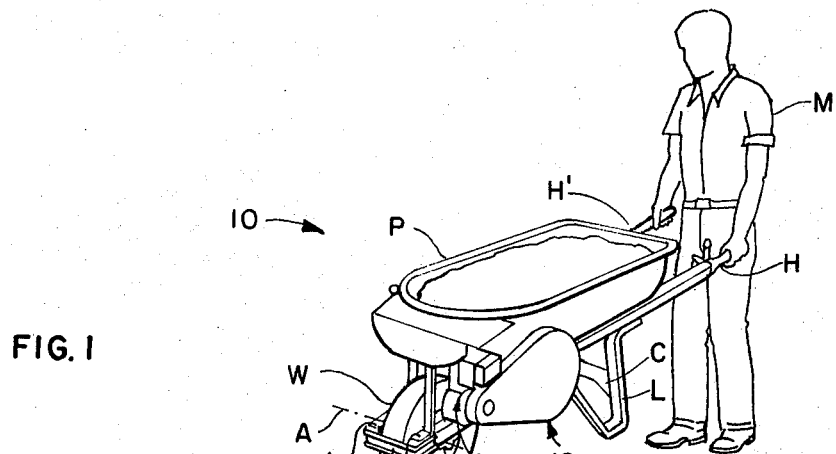
FIG. 1 is a perspective view of the invention in use transporting material.
Figure 2:
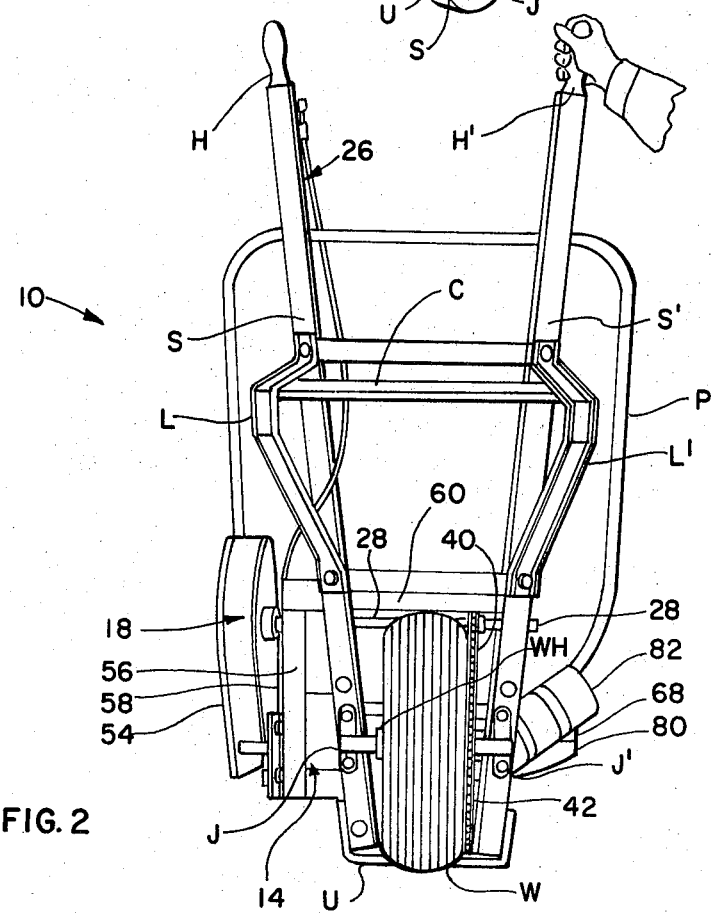
FIG. 2 is a bottom elevation of the invention in use dumping material.

FIG. 2 illustrates in bottom plan view the general disposition of the parts providing major advantages of this design. The wheelbarrow embodiment 10 includes the ordinary parts described in reference to FIG. 1: wheel W, shafts S, S', handles H, H', pan P, legs L, L' and crossbar C attaching the legs together and providing means of braking on narrow, high walkways where the legs cannot brake in unison.

FIGS. 2-5 indicate the dispositions of the parts of this invention to balance out on opposite sides of the wheel and fore-and-aft of the wheel. FIG. 5, indicates best how the drive to the wheel W is from engine output 22 through a three-stage reduction drive system 18 consisting of two chains, four sprockets, and a jackshaft, with all frame-mounted parts being bolted to the topside of the standard wooden wheelbarrow shafts under the protective front overhang of the pan. The first sprocket 20, is mounted to the engine output shaft 22, through a clutch 24. The clutch may be a centrifugal clutch biased to release at low shaft speeds. As the engine is accelerated by means of the throttle control cable assembly 26, the clutch locks sprocket 20 to the engine output shaft 22. This in turn drives jackshaft 28 through chain 30 and large jackshaft-sprocket 32 which is affixed to the jackshaft. The jackshaft turns in self-aligning pillow blocks 34 and 36, (FIG. 5) driving small jackshaft-sprocket 38, the ratio of the two jackshaft sprockets comprising the second stage of reduction.

Completing the three stages of reduction, the small jack-shaft sprocket 38, through chain 40, drives wheel sprocket 42. Wheel sprocket 42 is freely journalled on wheel hub WH (FIGS. 2, 4 and 5) of wheel W, and drives the wheel through a special dog-drive arrangement. As best shown in FIG. 5, the dog drive consists of a dog arm 44 having a screw-tightened split ring clamp 46 for engaging the wheel hub WH. The free end 48 of the dog drive has an integral threaded fastener 50, such as a nut welded to it. The wheel sprocket 42 is provided with a hole or slot at the same radial distance from the axis as the nut, so that a single machine screw 52 (FIGS. 4 and 5) is used to attach the dog drive, and the entire drive system, to the wheel, and conversely is removed for free-wheeling.

Speed control is variable by the throttle, which closes when not held open, safely disengaging the clutch, except when the clutch is accelerated by over-run, providing valuable braking retardation going downhill.

FIG. 5 also indicates the straightforward simplicity of mounting of the drive system, all operating parts of which bolt to the wooden shafts of the wheelbarrow. The engine, not shown, is carried on adjustable vertical plate 58, which is in turn attached to flanged plate 56, Side shield 54 and one pillow block 34 are mounted on the flanged plate 56, which in turn is mounted to shaft S. The other pillow block 36 is bolted at the opposite shaft of the wheelbarrow on an integral angular extension 60 of plate 56. The throttle control cable assembly 26 is led back and clipped to the handle end of one wheelbarrow shaft using woodscrews. Several important advantages of this system derive from this arrangement. Overconstraint is eliminated and a very low friction connection with the wheel is assured by the dog drive arrangement, even though the wheelbarrow hub is not made to serve as a precision axle for another device.

The standard wooden-shaft and formed-steel structure of construction wheelbarrows is not ideal to serve as a bed for engine and drive train. However, shape imperfections, misalignment, and looseness from working are compensated by the comination of dog drive, chain-and-sprocket reduction, and self-aligning jackshaft pillow blocks, and application of torque to the wheel, not the axle, according to the principles of this invention.

Jamming by concrete, rock particles and other debris encountered in construction work is largely eliminated by the combination of location and design of the drive train. As FIGS. 3 and 4 indicate, the drive mechanism is carried high up out of the mud and ruck normally encountered in construction work. In addition to being largely above the level of the wheelbarrow shafts, the drive train is protected by the overhang of the pan.

As best indicated by FIG. 2, the motor and drive train clear the ground sufficiently for unhampered past-vertical dumping in clearing the pan of concrete mix and the like. Side-to-side dumping in the raised position is also possible without striking the ground.

Last but not least, assembly, alignment and disassembly of the operating parts requires only a few minutes.

All the Figures show provision of the shielding which protects the motor and drive train, both from load spillage and from damaging contact with fixed objects are high enough to teach them.

As best shown in FIGS. 3, 4 and 7, the load spillage shield is a rooflike apron 62 extending forward from the upper part of the pan P. The apron 62 is tightly fitted to the pan and bolted to the braces provided in the front by bolts 72 and 76. Braces 68 and 70, fixed by bolts 74 and 78 to the wheelbarrow shafts; by bolts 72 and 76 to the apron 62, are also fixed to the pan using the brace holes provided by the manufacturer. The forward brace 68 serves as a bumper, preventing the motor from resting on the edges of the molds and the like during forward dumping.

The leading edge 80 of the apron 62 forms a downturned eave ahead of the front of the motor and drive-train, and is preferably rounded, as shown, giving better view and better maneuverability in tight quarters, while at the same time improving protection.

The side shield 54 protects the engine shaft, the clutch, the clutch-controlled sprocket, the chain and the jackshaft end and sprocket, as well as preventing injury to users through contact with the moving parts. As indicated clearly in FIGS. 3 and 4, the meshing locations of the chains and sprockets are either shielded or safely recessed between the shafts of the wheelbarrow and under the overhang of the pan and apron, making it very difficult to catch objects in the machinery. At the same time, the entire apparatus is made available for quick inspection from all sides, or for lubrication, by removing the side shield, and, if desired, the apron.

Another unique feature of the design is the type and installation of the fuel storage tank 82. The type tank chosen has an end-located sump 84 from which the fuel feed line 86 leads to the engine. To insure gasoline flow both during transport and forward dumping operations so long as any fuel remains in the tank, the tank is installed at an angle with the horizontal and the long axis of the wheel-barrow with the wheel-barrow at rest. As best indicated in FIGS. 2, 3, 4 and 6, the inclination is forward and down to the fuel outlet. The fuel outlet is slightly rotated to the front. Through this provision forward inclination becomes a downward inclination when the wheelbarrow is near vertical during dumping, providing fuel so long as an appreciable quantity remains in the tank. The filler is at the opposite end of the tank so that fuel can be added in either position.

FIG. 8 diagrams a final unique feature of an embodiment 800 of the invention. The wheel W is shifted toward the engine to improve balance, in this embodiment, as when the engine is considerably heavier than required for the particular wheel-barrow. A further feature which is provided for the same purpose is the cylindrical-tread tire 88, which places a portion of the tire in contact with the ground closer to the engine, shifting the lateral pivot point of the system.

Obviously many modifications and variations of the present invention are possible in light of the above teachings. It is, therefore, to be understood that within the scope of the appended claims the invention may be practiced otherwise than as specifically described.

What is claimed and desired to be secured by U.S. Letters Patent is:

1. A powered vehicle comprising: a common wheelbarrow having a body with a fore-and-aft axis of symmetry, a wheel rotatively attached about a single axle at one end of the body, ground support structure attached to the body in spaced relation to the wheel, operator grip structure integral with the body at the end away from the wheel; a motor-drive operatively connected with the wheel, the motor-drive secured at the wheel in position minimizing imbalance of the weight of the motor drive fore-and-aft about said axle with the wheelbarrow in load supporting attitudes, a portion of the motor drive being secured lateral to the wheel on each side thereof, with the weight of said motor drive portions substantially counter balancing each other about a portion of the wheel periphery, a portion of the motor drive lateral to the wheel on one side having a greater moment about said symmetrical axis than the portion of the motor drive on the other side of the wheel, and wherein the wheel is offset with respect to said fore-and-aft axis of symmetry, thereby effecting said substantial counterbalance about the wheel-periphery portion.

2. A powered vehicle comprising: a common wheelbarrow having a body with a fore-and-aft axis of symmetry, a wheel rotatively attached about a single axle at one end of the body, ground support structure attached to the body in spaced relation to the wheel, operator grip structure integral with the body at the end away from the wheel; a motor-drive operatively connected with the wheel, the motor-drive secured at the wheel in position minimizing imbalance of the weight of the motor drive fore-and-aft about said axle with the wheelbarrow in load supporting attitudes, a portion of the motor drive being secured lateral to the wheel on each side thereof, with the weight of said motor drive portions substantially counter-balancing each other about a portion of the wheel periphery, a portion of the motor drive lateral to the wheel on one side having a greater moment about said symmetrical axis than the portion of the motor drive on the other side of the wheel, and wherein the wheel has a cylindrical periphery adapted for making a wide contact with the ground, thereby effecting said substantial counterbalance about a portion of the wheel offset from said fore-and-aft axis of symmetry.

3. A powered vehicle comprising: a common wheelbarrow having a wheel rotatively mounted on a single axle, a body comprising a pair of shafts disposed rearwardly from the wheel with a load bed carried intermediate the length of the shafts, the load bed having a forward portion overhanging a part of the wheel, operator grip structure at the end of the shafts away from the wheel, ground support structure attached to the body in spaced relation to the wheel, and a motor drive secured at the wheel in position minimizing imbalance of the weight of the motor drive fore-and-aft about said axle with the wheelbarrow in load supporting attitudes, the motor drive including an engine mounted to a said shaft lateral to the wheel, proximate the load bed overhang.

4. A powered vehicle as recited in claim 3, the motor drive including: a dog drive having a portion rotatively journalled about the wheel axis on the side opposite the engine, the dog drive including a disconnectable attachment with the rotatively journalled portion and an attachment to the wheel; and drive train means substantially positioned under the load bed overhang above the wheel axis, connecting the engine with the dog drive.

5. A powered vehicle as recited in claim 4, wherein the rotatively journalled portion of the dog drive is a wheel sprocket, wherein the disconnectable attachment is a screw threaded into the wheel sprocket, wherein the drive train means comprises a jackshaft rotatively mounted under said overhang to said pair of shafts, wherein a relatively small sprocket is affixed to the jackshaft and has a chain-connection to the dog drive sprocket; wherein a relatively large sprocket is affixed to the jackshaft and has chain-connection with the output of the engine; wherein the engine output comprises a sprocket with an inertial clutch control, and wherein the engine has a manual, spring-shut proportional control, affixed at the operator-grip structure with a cable connection to the engine.

6. A powered vehicle as recited in claim 3, and a fuel tank connected with the engine, the fuel tank comprising an elongate structure installed diagonally on the side of the vehicle opposite the engine with one end tending forward-and-down in the load supporting attitude of the vehicle, said forward-and-down end having an outlet in a low portion thereof facing diagonally down and forward, whereby the tank is adapted to provide fuel flow in both load supporting attitudes and near vertical dumping attitudes of the vehicle.

7. A powered vehicle as recited in claim 3, wherein structure is provided for shielding the motor drive from material to be transported and dumped, said structure including an apron extending from the load bed overhand forward over the motor-drive and down at the forward edge; and a vertical strut fixed at the bottom to a said shaft ahead of the motor-drive and connecting with the apron, thereby supporting the apron in front and providing a bumper preventing contact between the motor-drive and obstacles such as forms during forward dumping of the load.

8. A powered vehicle as recited in claim 7, and a shield covering the engine side of the motor-drive from the overhang of the load bed forward.

* * * * *